(No Model.)

G. A. LARSEN.
FISHING TACKLE.

No. 533,540. Patented Feb. 5, 1895.

Witnesses:
E. K. Sturtevant
A. S. Büsing

Inventor:
Gustav Adolf Larsen,
by
atty.

UNITED STATES PATENT OFFICE.

GUSTAV ADOLF LARSEN, OF FREDRIKSSTAD, NORWAY.

FISHING-TACKLE.

SPECIFICATION forming part of Letters Patent No. 533,540, dated February 5, 1895.

Application filed June 2, 1894. Serial No. 513,276. (No model.) Patented in Norway November 1, 1893, No. 3,421.

*To all whom it may concern:*

Be it known that I, GUSTAV ADOLF LARSEN, a subject of the King of Sweden and Norway, and a resident of Fredriksstad, Norway, have invented a certain new and useful Improved Fishing-Tackle, (for which I have obtained a patent in Norway, No. 3,421, dated November 1, 1893,) of which the following is a specification.

My invention relates to an improved fishing tackle called "svordnoten" devised for fishing in the open sea by being towed by a steam or sailing ship.

The apparatus is illustrated in the accompanying drawings, wherein—

Figure 1:
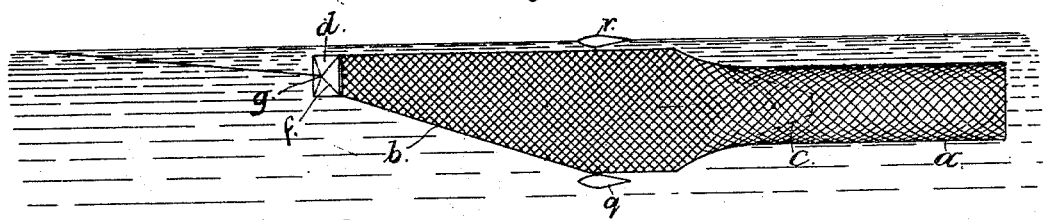
Figure 3:
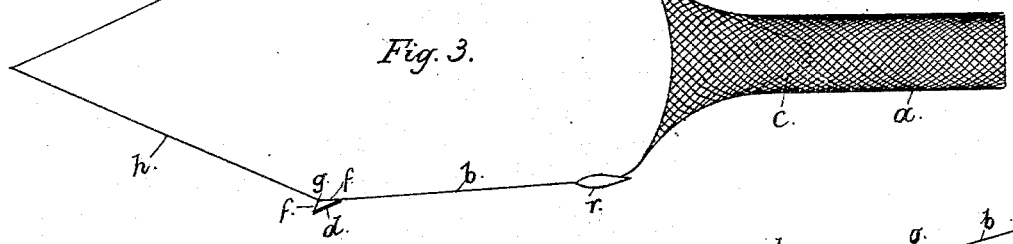
Figure 2:
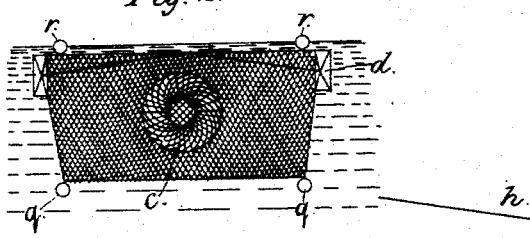
Figure 4:
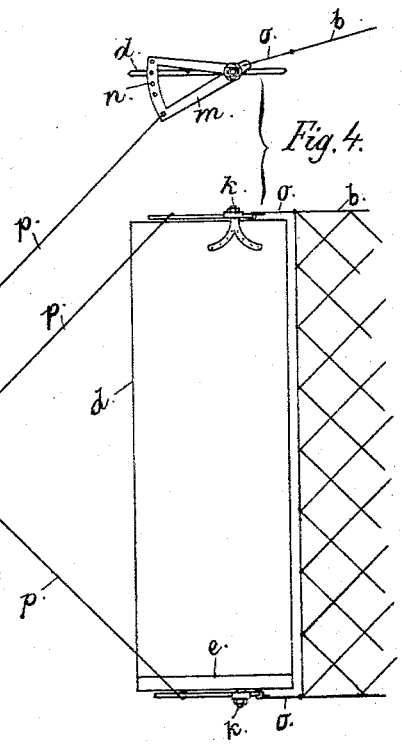

Figure 1 is a side-elevation. Fig. 2 is a front elevation. Fig. 3 is a plan view. Fig. 4 is a detail of the arrangement for adjusting the oblique position of the boards, $d$.

The apparatus consists of a large bag or reservoir, $a$, and two vertical arms, $b$, projecting from the mouth of the bag, $a$. The said bag and the arms are knitted of hemp, manila or other suitable material. The bag, $a$, serves as a receptacle for the fish and the arms, $b$, guide the fish into the said bag. Near the mouth of the bag, $a$, is placed a funnel shaped, backward pointing, partition wall, $c$, provided at its smallest end with a small opening, the object of this partition wall being to prevent the fish from escaping out of the said bag. In order to automatically open the apparatus during the towing a board, $d$, is fixed to the front end of each arm, $b$, the said boards being given such an oblique position, that they will, on account of the pressure of the water, run out sidewise or diverge and thus open the fishing tackle. The said boards are kept upright in the water by means of a keel, $e$, being attached to their bottom end, and they are kept in their oblique position by means of ropes, $f$, being fastened to the corners of the said boards and joined in a knot, $g$, situated somewhat before the middle of the said boards, and from this point or knot, $g$, joins the said boards, $d$, and thereby the whole apparatus on to the towing hawser of the ship.

In Fig. 4 is shown a mode of adjusting the oblique position of the said boards, $d$, the latter being at their top and bottom provided with pivots, $k$, on which a sector may turn so that the part, $m$, of the said sector may form a larger or smaller angle with the board, $d$, and in order to secure a rigid position of the sector to the board, $d$, the arc, $n$, of the said sector is provided with a number of holes through which a bolt may be fastened in the board, $d$. The said boards, $d$, are by this arrangement fastened to the arms, $b$, of the apparatus by ropes, $o$, and they are fastened to the above named ropes, $h$, by means of ropes, $p$, of equal length running out from the part, $m$, of the said sector. The said ropes, $h$, should be of sufficient length, so as to allow the apparatus to be opened fully during the towing of the same.

In order to make the apparatus sink, weights, $q$, are fastened to the lower part of the same, and in order to keep the apparatus at any suitable depth, floats, $r$, are fastened to the upper part of the same by means of ropes, which may be made longer or shorter according to the depth desired.

When the speed of the fishing tackle diminishes or the fishing tackle drags on account of the weight of the quantity of the fish, the two arms, $b$, will approach each other and thus more or less shut the entrance to the bag, $a$.

Having now described my invention, what I claim as new, and desire to secure by Letters Patent, is—

A fishing-tackle consisting of a large bag or reservoir, $a$, a funnel shaped partition wall, $c$ in the mouth thereof for retaining the fish and two vertical arms, $b$, projecting from the mouth of the said bag, $a$, for guiding the fish into the same, and pivoted boards, $s$, $d$, placed obliquely and operating substantially as shown and described.

In witness whereof I have hereunto set my hand in presence of two witnesses.

GUSTAV ADOLF LARSEN.

Witnesses:
 OSC WINGE,
 FREDRIK OLSEN.